C. D. McDOWELL.
SELF WINDING HOSE REEL.
APPLICATION FILED FEB. 29, 1916.
1,227,466.
Patented May 22, 1917.
2 SHEETS—SHEET 1.
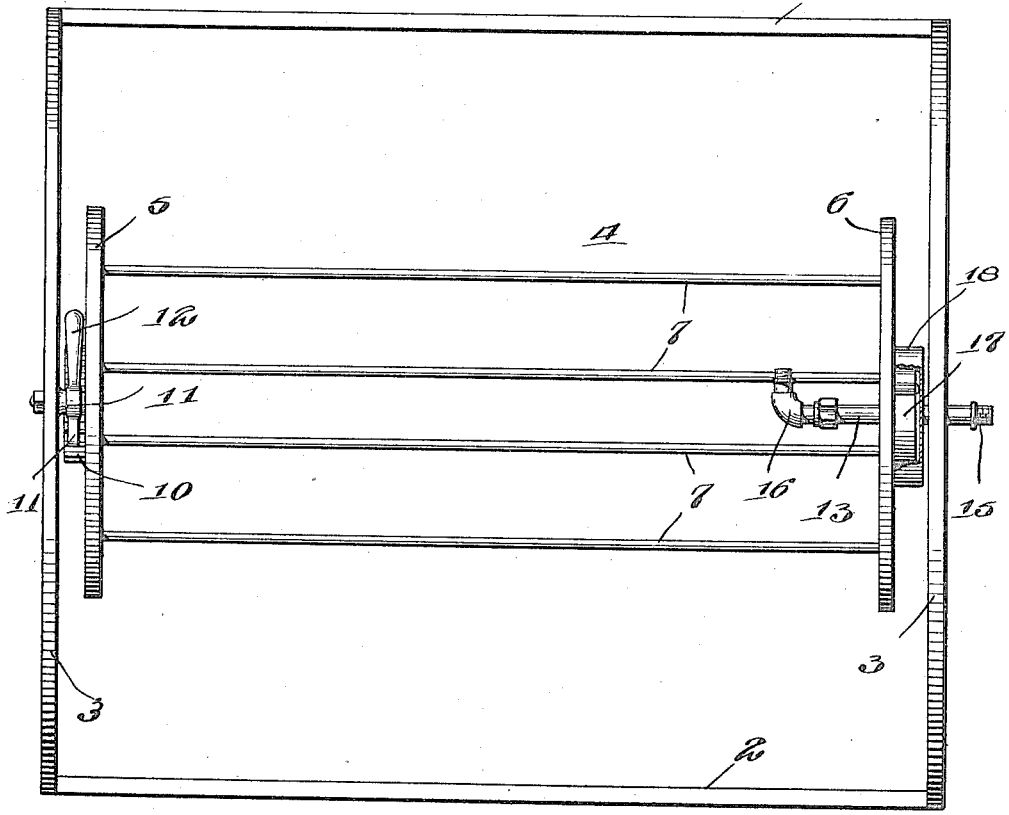
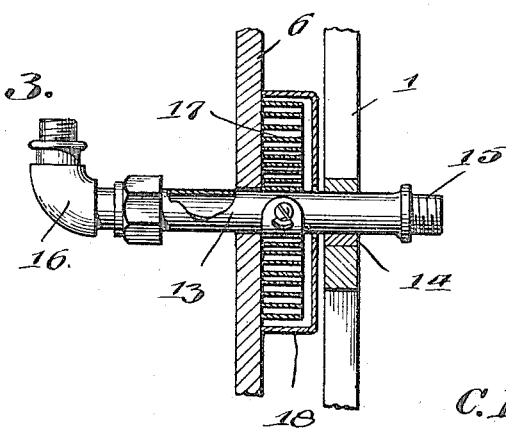
Witnesses
Frederick L. Fox,
J. W. Garner
Inventor
C. D. McDowell.
By Victor J. Evans
Attorney

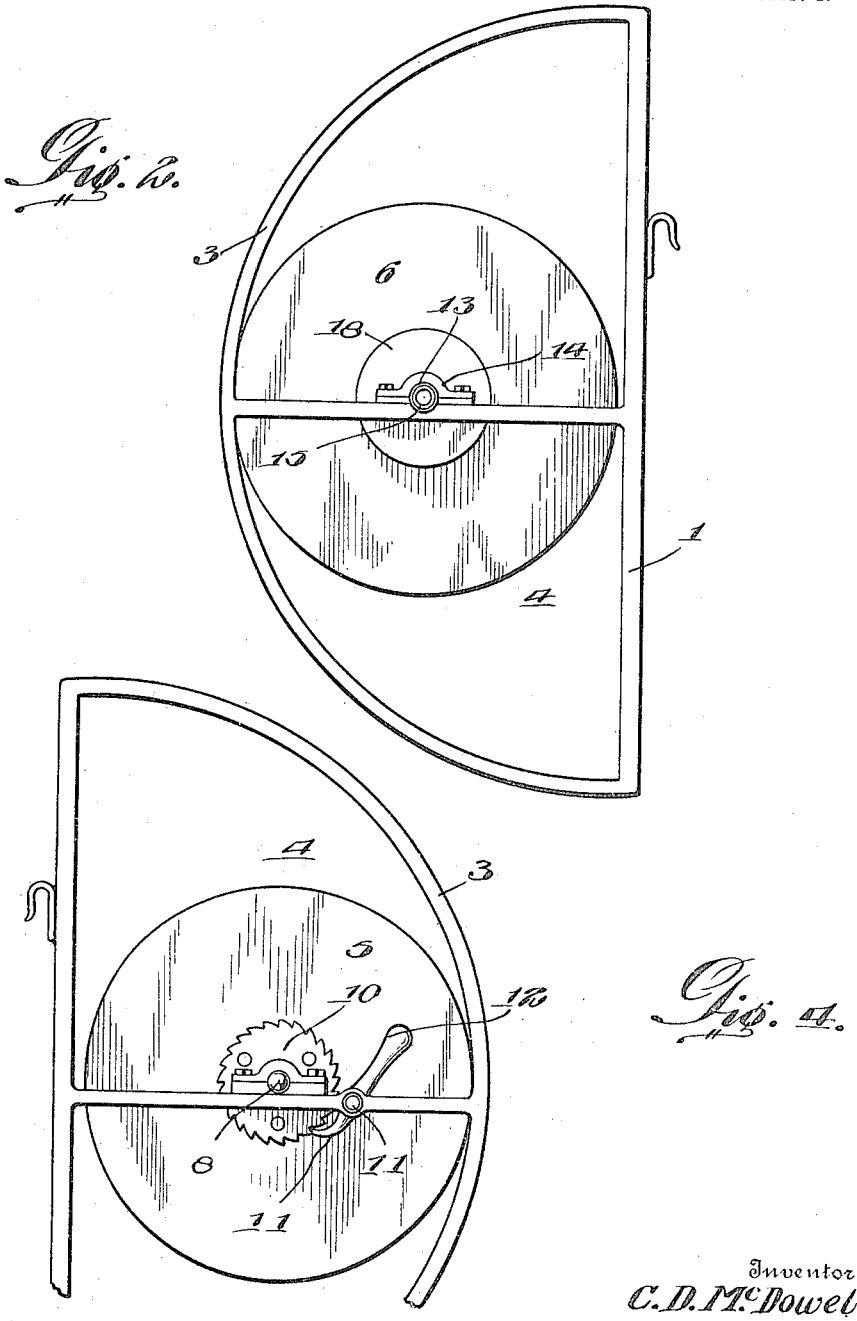

UNITED STATES PATENT OFFICE.

CANTELLA DELL McDOWELL, OF PONTIAC, MICHIGAN.

SELF-WINDING HOSE-REEL.

1,227,466.      Specification of Letters Patent.      Patented May 22, 1917.

Application filed February 29, 1916. Serial No. 81,226.

*To all whom it may concern:*

Be it known that I, CANTELLA D. McDOWELL, a citizen of the United States, residing at Pontiac, in the county of Oakland and State of Michigan, have invented new and useful Improvements in Self-Winding Hose-Reels, of which the following is a specification.

This invention is an improved self winding hose reel which may be made of any suitable size to accommodate different lengths of hose and which operates automatically to wind up the hose after the latter has been used.

The invention consists in the construction, combination and arrangement of devices hereinafter described and claimed.

In the accompanying drawings:—

Figure 1 is a front elevation of a self winding hose reel constructed and arranged in accordance with my invention.

Fig. 2 is an end elevation of the same.

Fig. 3 is a detail longitudinal sectional view, on a larger scale, through the tubular axle of the reel which forms the hose connection.

Fig. 4 is a detail transverse sectional view.

In the embodiment of my invention I provide a suitable frame 1 which comprises an oblong rectangular member 2 and a pair of substantially semi-circular end members 3.

The reel 4 comprises a pair of heads 5, 6 and rods 7 which connect said heads together in spaced relation. The head 3 has a centrally arranged stub axle 8 which is mounted in a bearing 9 on one of the end members 3 of the frame. A ratchet wheel 10 and pawl 11 are provided at the end 5 of the reel to permit the reel to turn in one direction and prevent it from turning in the reverse direction when the pawl is engaged with the ratchet wheel. The ratchet wheel is secured on the center of the head 5 and the pawl is pivotally mounted as at 11ª and has an operating arm 12 to enable the pawl to be disengaged from the ratchet wheel when desired, the pawl by its own gravity normally engaging the ratchet wheel.

The head 6 of the reel is mounted for rotation on a tubular axle 13 which is secured in a box 14 and is provided at its outer end with a coupling 15 for the attachment of a supply hose leading from a hydrant or the like. At the inner end of the said tubular axle is an L 16 which is swivelly connected thereto so that the L can rotate together with the reel in either direction. The hose which is wound on the reel is coupled to the L. A spring 17 is also provided to turn the reel in the required direction to cause the same to wind up the hose, one end of the said spring being connected to the head 6 and the other end being attached to the box 14 or to the tubular axle 13. A circular casing 18 is provided in which said spring is arranged.

When it is desired to unreel the hose this may be done by first disengaging the pawl from the ratchet wheel and then drawing outwardly on the hose, the hose thus causing the reel to turn against the resistance of the spring so that the spring becomes wound. When the hose has been drawn out to the desired extent the pawl is engaged with the ratchet wheel to prevent the turning of the reel by the spring when the hose is being used. When it is desired to rewind the reel it is only necessary to disengage the pawl from the ratchet wheel, whereupon the spring revolves the reel in the required direction to wind up the hose.

Having thus described my invention what I claim is:—

In combination with a hose reel mounted for rotation and a fixed tubular axle on which one end of the reel turns, means to connect one end of the tubular axle to a supply hose, an L swivelly connected to the inner end of the tubular axle for rotation thereon with the reel and arranged for the attachment of a hose thereto and a coiled spring to rotate the reel in one direction the inner end of said spring being attached to said fixed tubular axle and the outer end of the spring being connected to the reel.

In testimony whereof I affix my signature in presence of two witnesses.

CANTELLA DELL McDOWELL.

Witnesses:
ENOCH J. EBEY,
WM. C. MAYBER.

Copies of this patent may be obtained for five cents each, by addressing the "Commissioner of Patents, Washington, D. C."